(12) United States Patent
Kanai et al.

(10) Patent No.: US 12,235,280 B2
(45) Date of Patent: Feb. 25, 2025

(54) AUTOMATIC ANALYZER

(71) Applicant: Hitachi High-Tech Corporation, Tokyo (JP)

(72) Inventors: Daisuke Kanai, Tokyo (JP); Koki Yokoyama, Tokyo (JP); Takenori Okusa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 766 days.

(21) Appl. No.: 17/275,392

(22) PCT Filed: Jan. 9, 2020

(86) PCT No.: PCT/JP2020/000428
§ 371 (c)(1),
(2) Date: Mar. 11, 2021

(87) PCT Pub. No.: WO2020/170636
PCT Pub. Date: Aug. 27, 2020

(65) Prior Publication Data
US 2022/0057419 A1    Feb. 24, 2022

(30) Foreign Application Priority Data
Feb. 18, 2019 (JP) ................ 2019-026317

(51) Int. Cl.
G01N 35/02   (2006.01)
G01N 35/00   (2006.01)

(52) U.S. Cl.
CPC . *G01N 35/025* (2013.01); *G01N 2035/00287* (2013.01); *G01N 2035/00306* (2013.01)

(58) Field of Classification Search
CPC ....... G01N 35/025; G01N 2035/10287; G01N 2035/00306
See application file for complete search history.

(56) References Cited

U.S. PATENT DOCUMENTS

| | | | |
|---|---|---|---|
| 5,628,962 A | 5/1997 | Kanbara et al. | |
| 2001/0028863 A1* | 10/2001 | Kitagawa | G01N 35/00 422/63 |

(Continued)

FOREIGN PATENT DOCUMENTS

| EP | 2 306 205 A2 | 4/2011 |
|---|---|---|
| JP | 08-94624 A | 4/1996 |

(Continued)

OTHER PUBLICATIONS

International Search Report of PCT/JP2020/000428 dated Mar. 17, 2020.

(Continued)

*Primary Examiner* — Jill A Warden
*Assistant Examiner* — Alex Ramirez
(74) *Attorney, Agent, or Firm* — MATTINGLY & MALUR, PC

(57) ABSTRACT

The invention provides an automatic analyzer capable of closing a lid of a container containing a reagent or a specimen without wearing an upper surface of the lid even when the lid fails to close. The automatic analyzer includes a container accommodation portion that has a lid openable and closable by a rotation fulcrum and accommodates a container containing a reagent or a specimen, and a lid closing guide portion that closes the lid by moving relative to the container accommodation portion, wherein the lid closing guide portion is in contact with an edge of the lid to close the lid.

10 Claims, 10 Drawing Sheets

(56) References Cited

U.S. PATENT DOCUMENTS

| | | |
|---|---|---|
| 2006/0120922 A1 | 6/2006 | Matsumoto et al. |
| 2008/0095668 A1 | 4/2008 | Mototsu et al. |
| 2013/0209333 A1 | 8/2013 | Nuotio et al. |
| 2020/0033374 A1 | 1/2020 | Kabe et al. |

FOREIGN PATENT DOCUMENTS

| | | | |
|---|---|---|---|
| JP | 10311835 A * | 11/1998 | |
| JP | 2006-30170 A | 2/2006 | |
| JP | 2008-96221 A | 4/2008 | |
| JP | 2010-101910 A | 5/2010 | |
| WO | WO-2018173464 A1 * | 9/2018 | .............. B01L 3/523 |

OTHER PUBLICATIONS

Extended European Search Report received in corresponding European Application No. 20759407.8 dated Feb. 17, 2023.
Partial Supplementary European Search Report received in corresponding European Application No. 20759407.8 dated Nov. 18, 2022.

* cited by examiner

[FIG. 1]
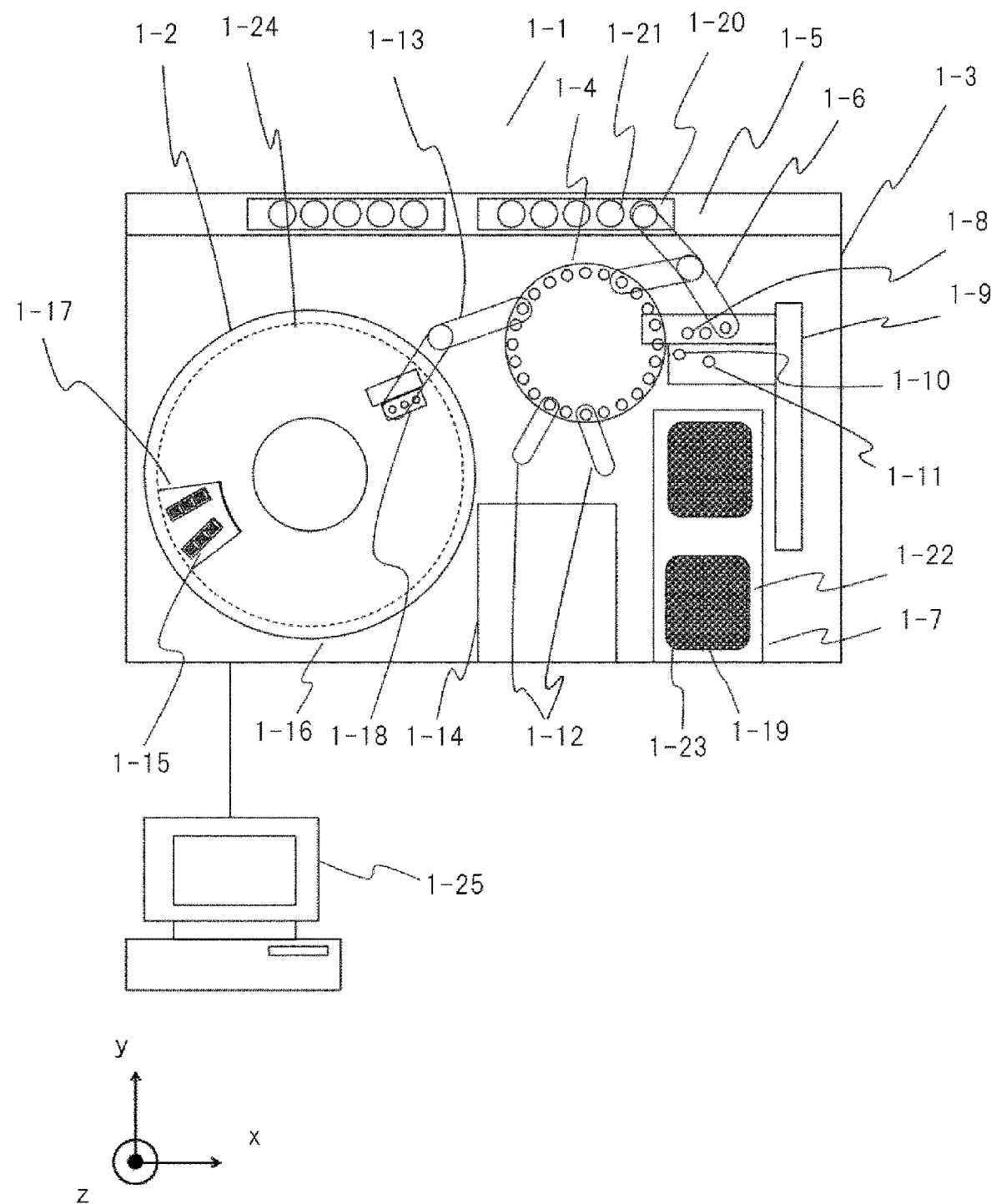

[FIG. 2]
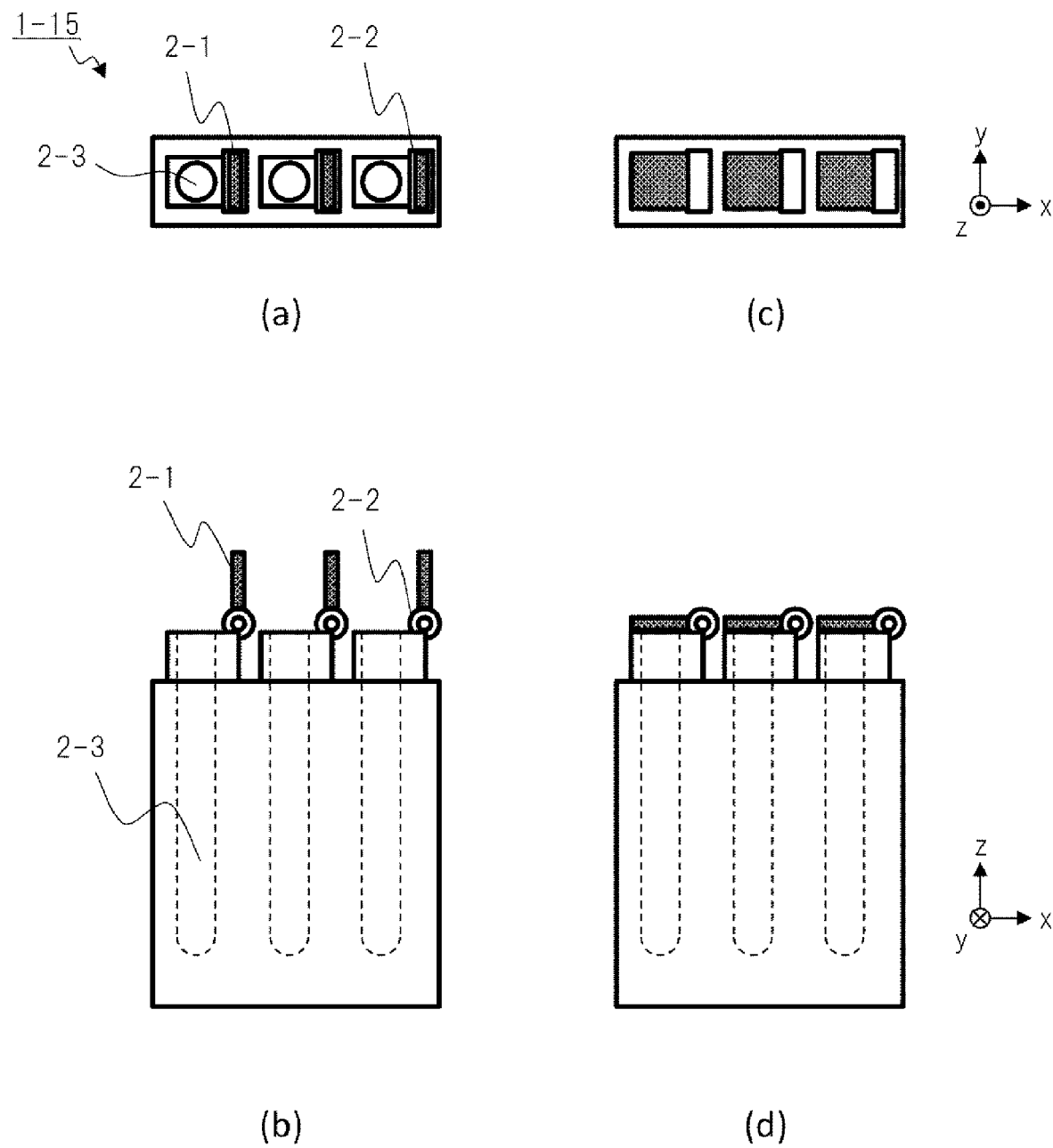

[FIG. 3]
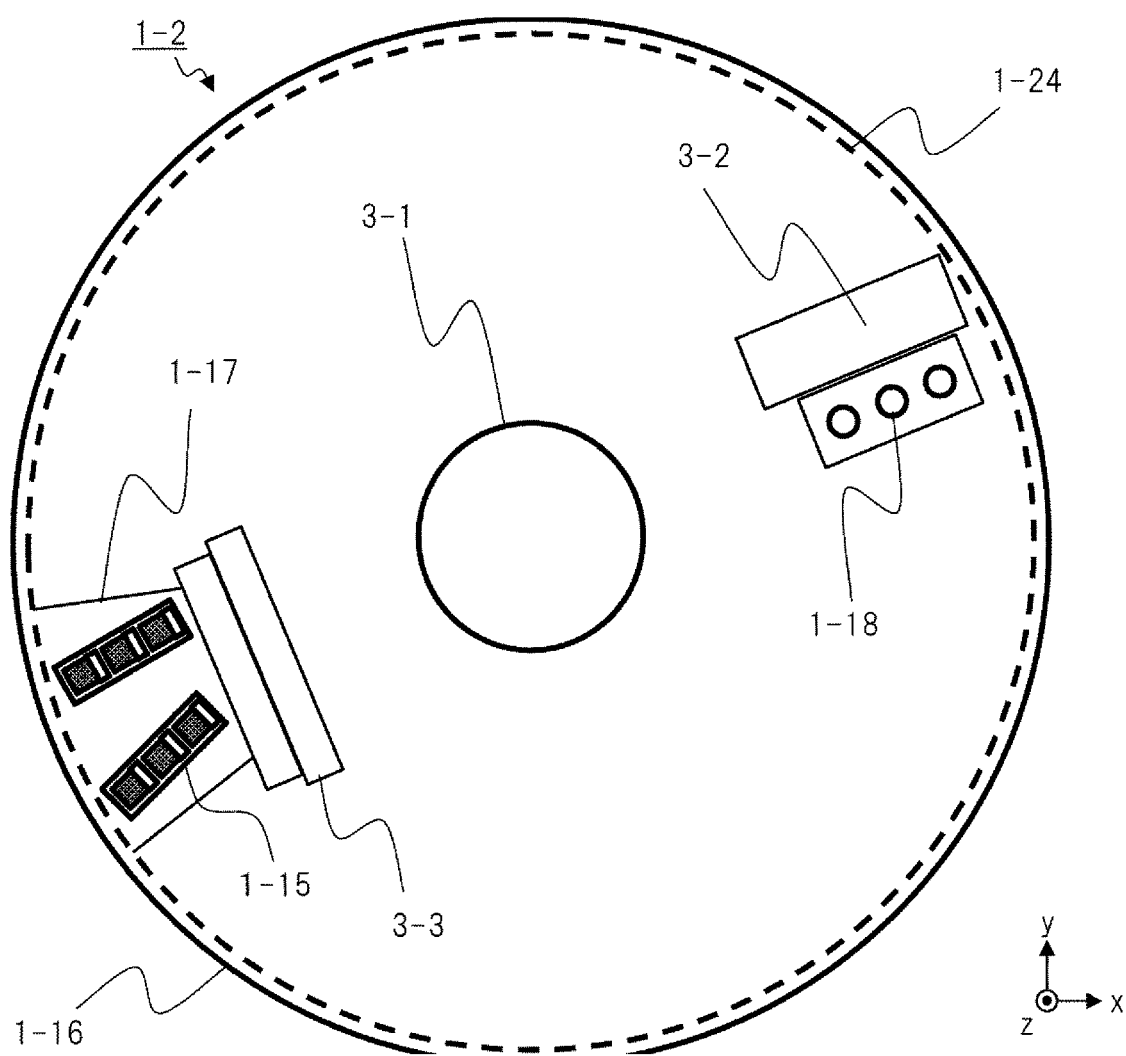

[FIG. 4]
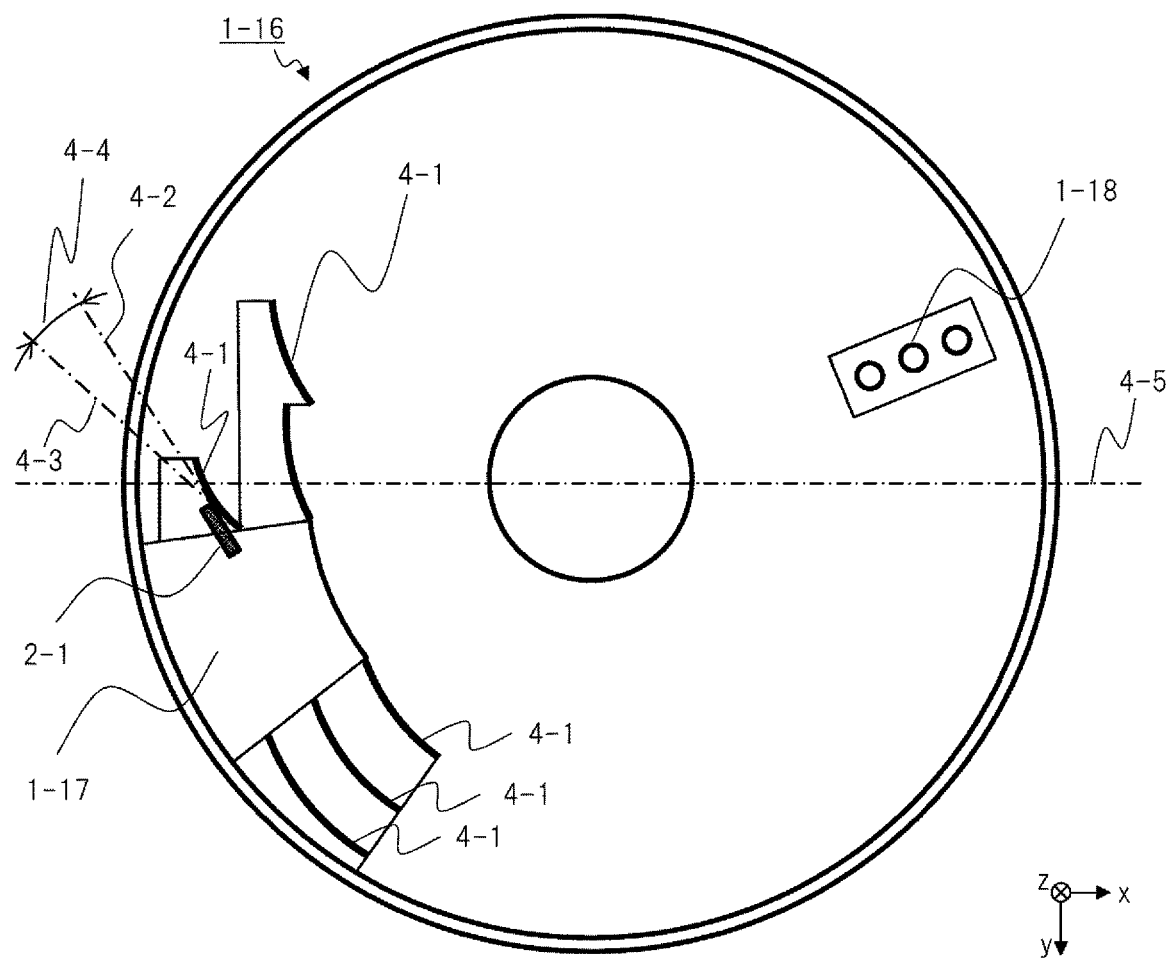
(a)
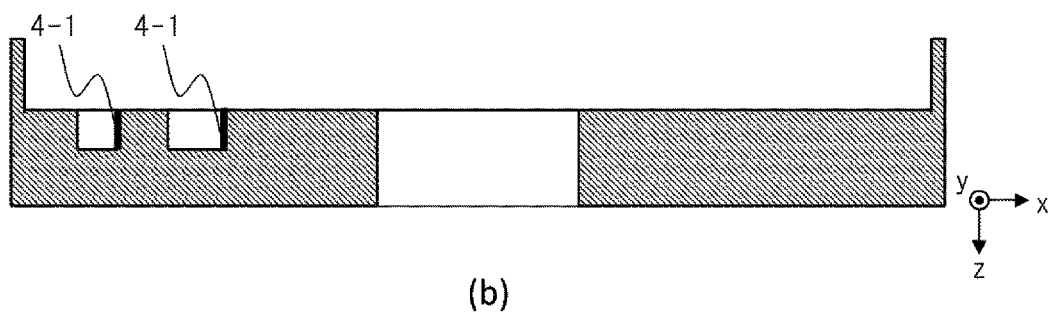
(b)

[FIG. 5]
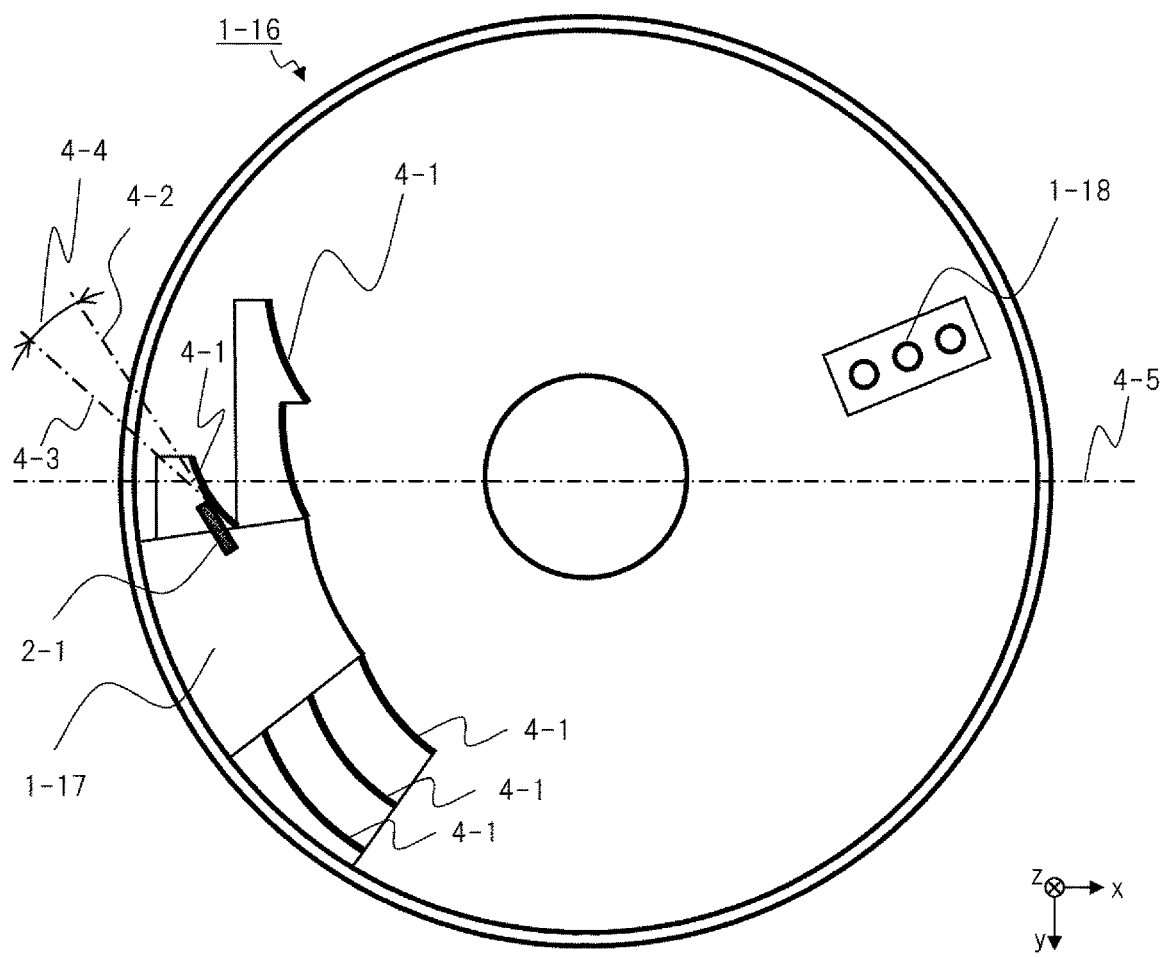
(a)
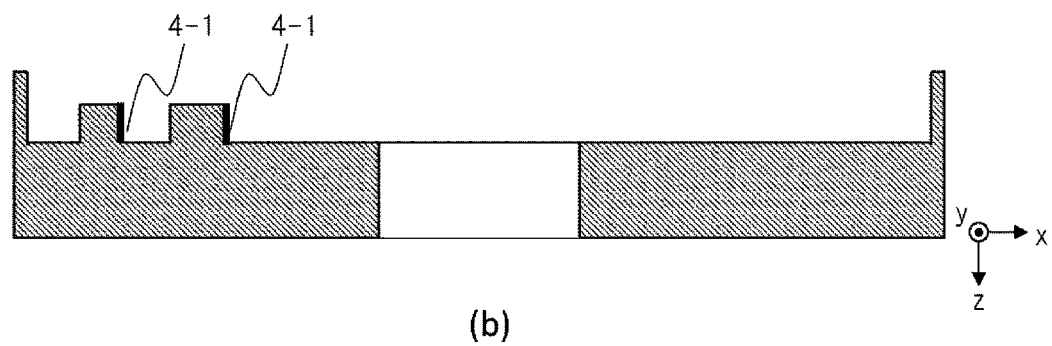
(b)

[FIG. 6]
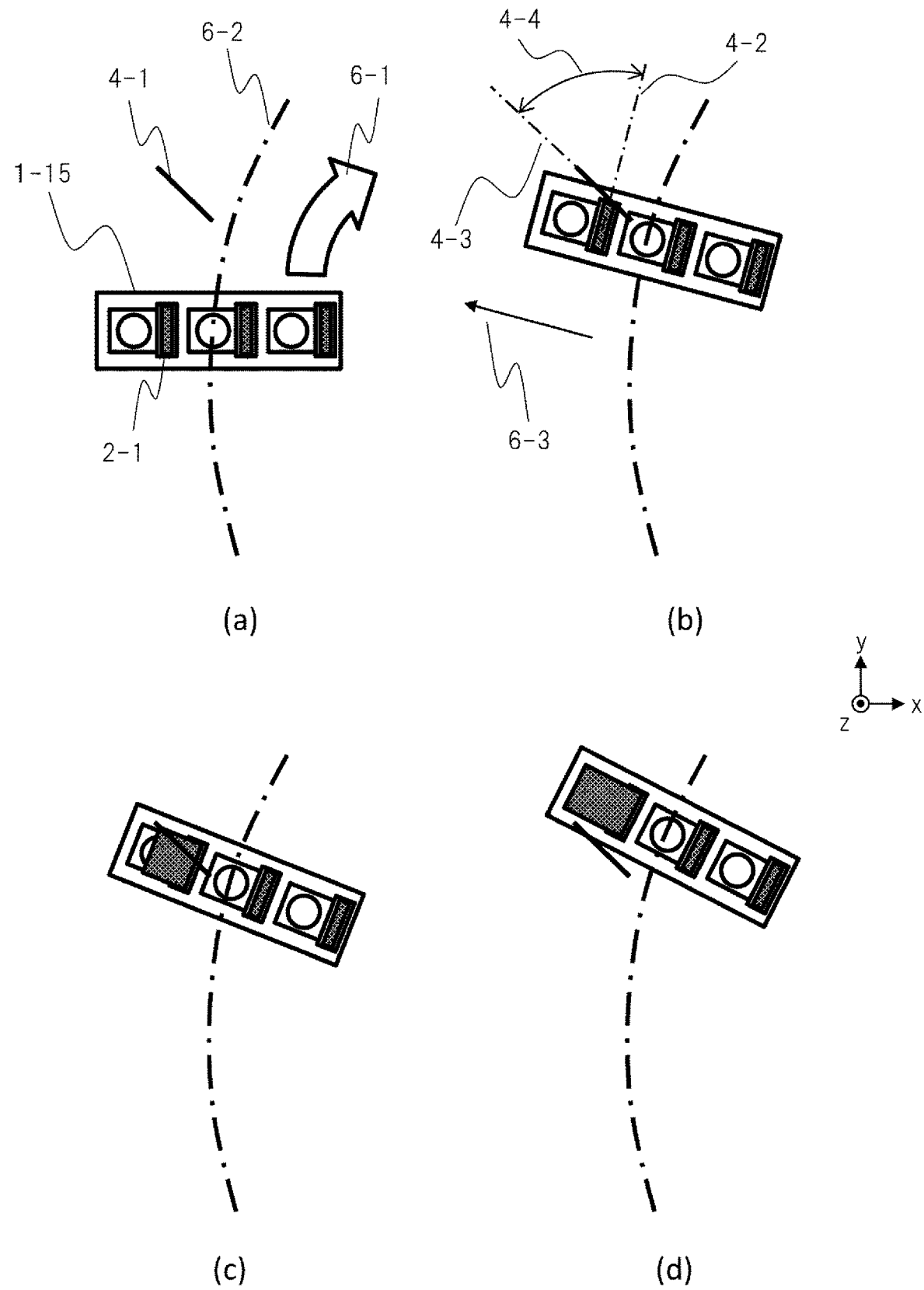

[FIG. 7]
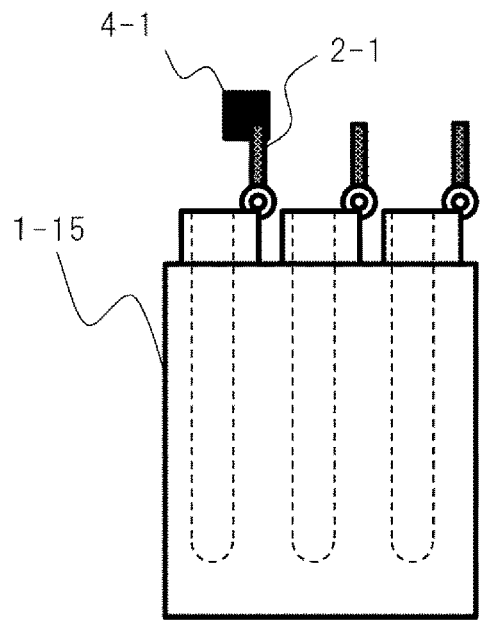
(a)
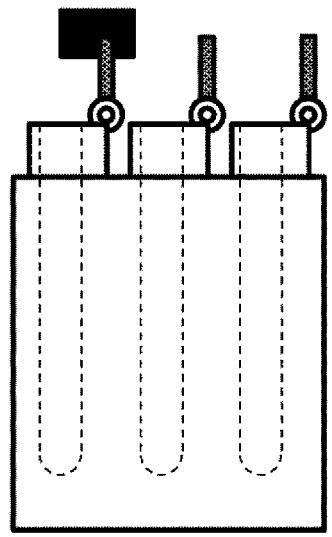
(b)
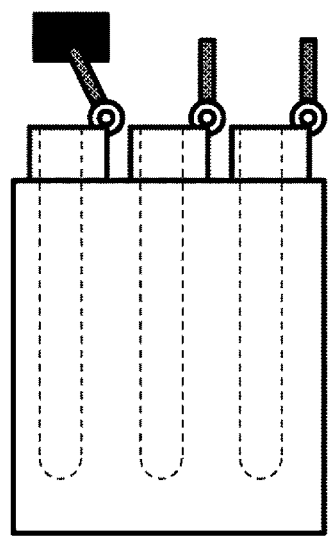
(c)
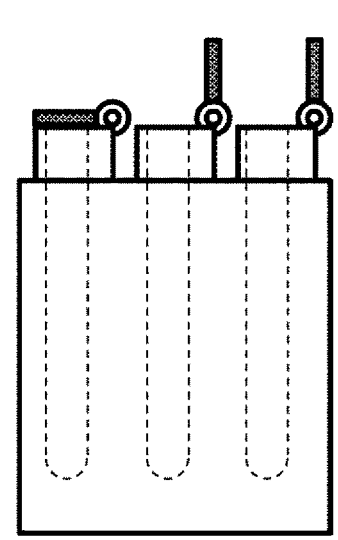
(d)
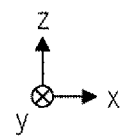

[FIG. 8]
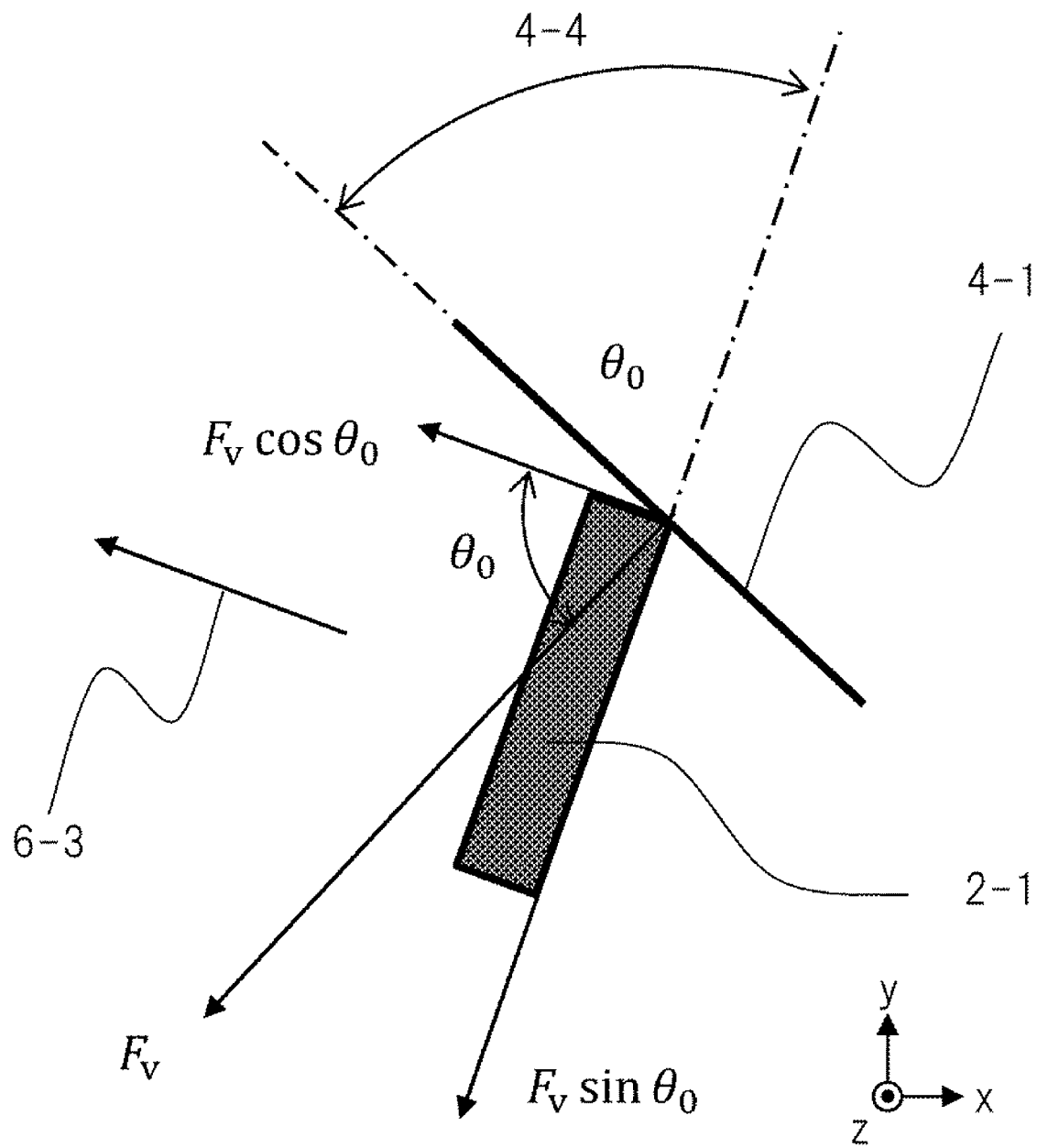

[FIG. 9]
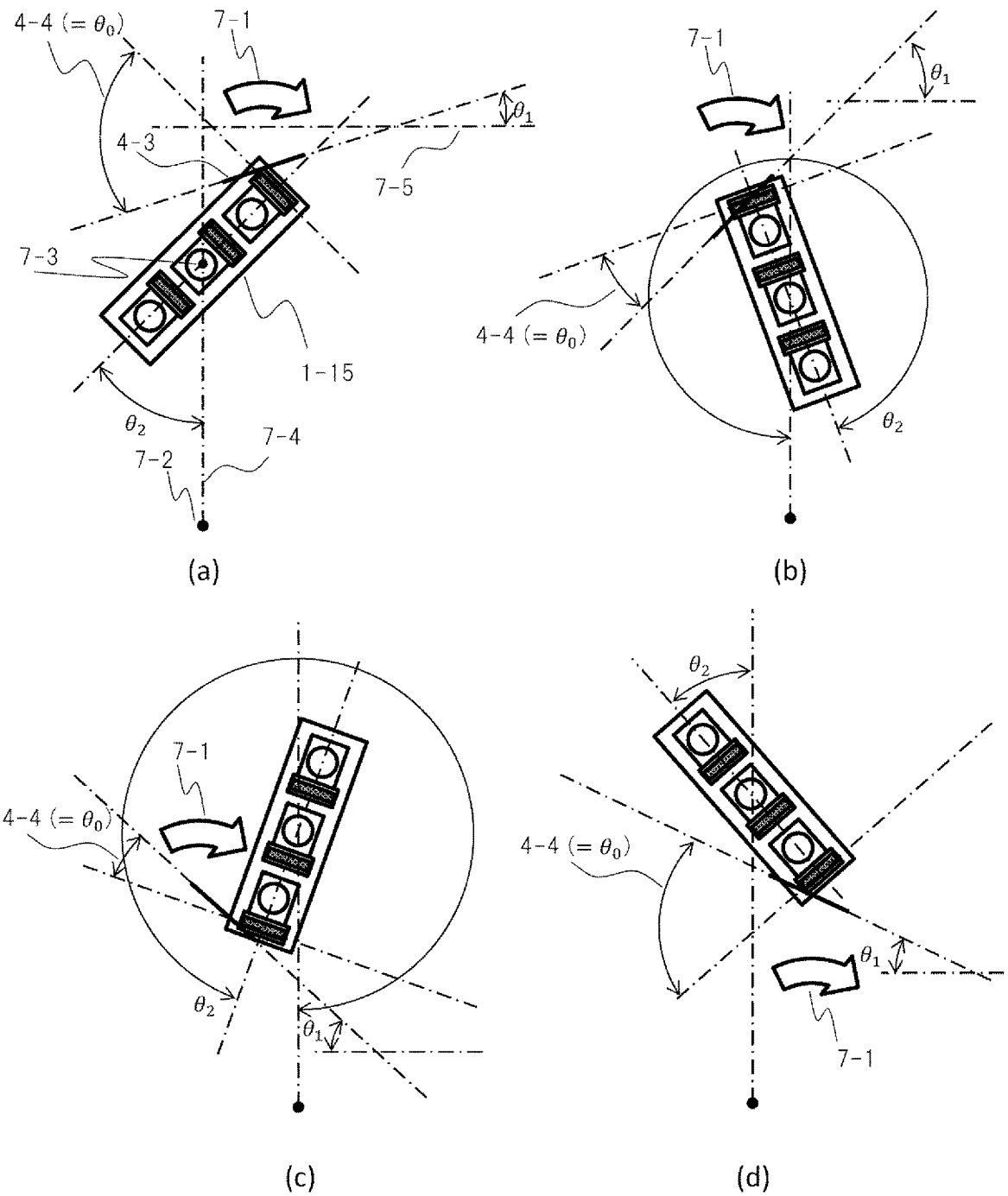

[FIG. 10]
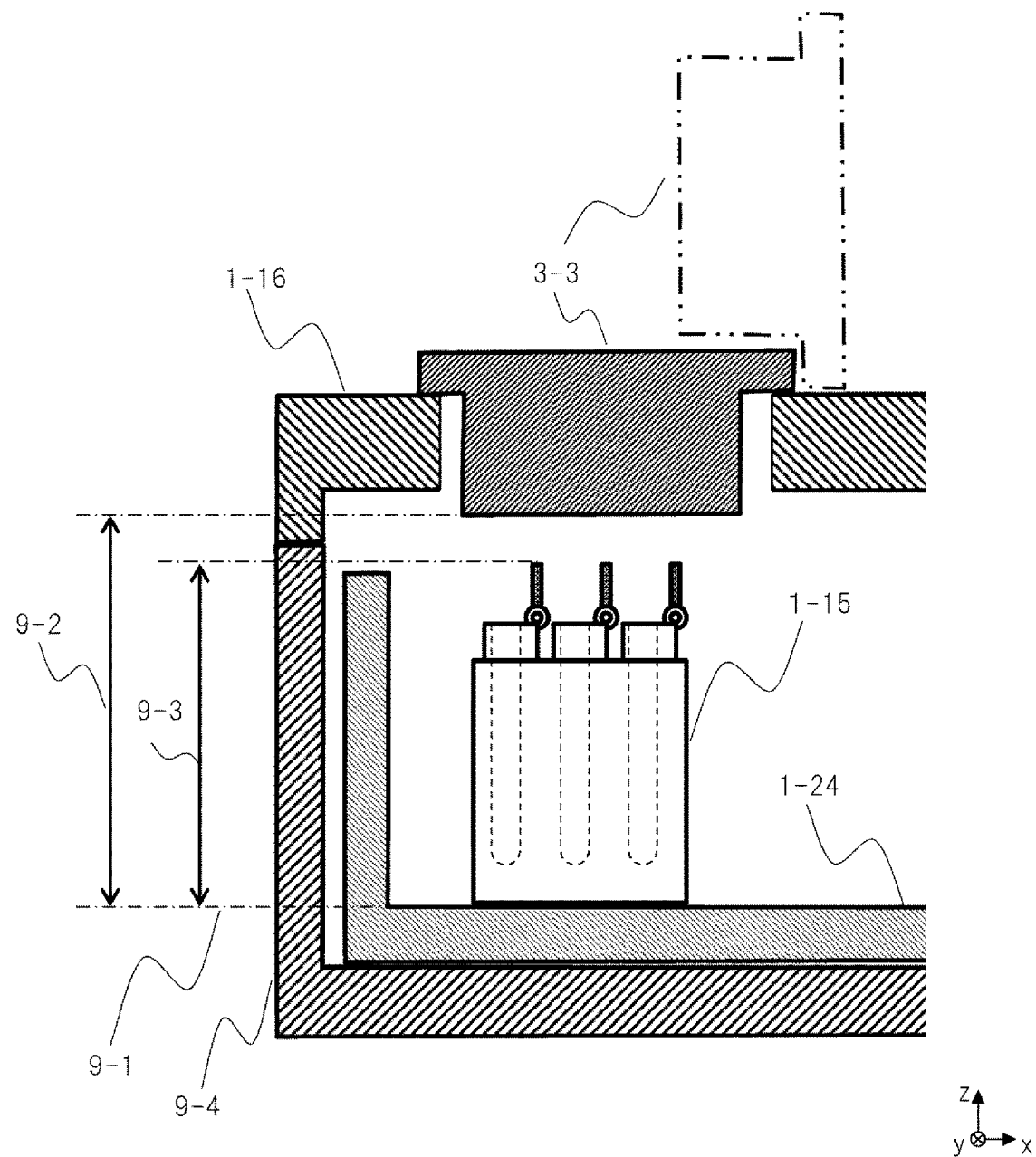

AUTOMATIC ANALYZER

TECHNICAL FIELD

The present invention relates to an automatic analyzer.

BACKGROUND ART

The automatic analyzer is a device that automatically performs quantitative or qualitative analysis of a specific component included in a specimen such as blood or urine. Various reagents are used for the analysis of a specimen by the automatic analyzer, and in order to obtain stable analysis results, it is necessary to prevent the concentration of reagents due to evaporation and drying or the deterioration of reagents due to the entry of dirt and the like. Therefore, a reagent used for analysis is contained in a reagent container including an openable and closable lid, and the lid of the reagent container is opened and closed depending on the situation.

Patent Literature 1 discloses an automatic analyzer including a reagent container and an opening and closing member, the reagent container having a protruding lug part and an openable and closable lid by a rotation fulcrum, the opening and closing member opening and closing the lid of the reagent container in which the reagent container and the opening and closing member are put into a relative displacement to bring the opening and closing member into contact with the lug or the lid, and thus the lid is opened and closed.

CITATION LIST

Patent Literature

Patent Literature 1: Japanese Unexamined Patent Application Publication No. 2010-101910

SUMMARY OF INVENTION

Technical Problem

However, in Patent Literature 1, since the opening and closing member is brought into contact with the upper surface of the lid of the container, the upper surface of the lid on which information on a reagent or a specimen contained in the container is written may be abraded to lose the information on the reagent or the specimen. When the container is accommodated in a storage with the lid of the container failing to close, the lid and the storage interfere with each other, and an excess load may be applied to any of the lid and the storage.

Therefore, an object of the present invention is to provide an automatic analyzer that is capable of closing a lid without wearing the upper surface of the lid even when the lid of a container, which contains a reagent or a specimen, fails to close.

Solution to Problem

In order to achieve the object, the present invention is an automatic analyzer, including a container accommodation portion that has a lid openable and closable by a rotation fulcrum and accommodates a container containing a reagent or a specimen, and a lid closing guide portion that closes the lid by moving relative to the container accommodation portion. The lid closing guide portion is in contact with an edge of the lid to close the lid.

Advantageous Effects of Invention

According to the present invention, an automatic analyzer that is capable of closing a lid without wearing the upper surface of the lid even when the lid of a container, which contains a reagent or a specimen, fails to close can be provided.

BRIEF DESCRIPTION OF DRAWINGS

FIG. 1 is a plan view showing a configuration example of an automatic analyzer.

FIG. 2 is a schematic configuration diagram of a reagent container used in the automatic analyzer.

FIG. 3 is a plan view showing a configuration example of a reagent storage that is a main portion of the automatic analyzer.

FIG. 4 is a view showing an example of a lid closing guide portion provided on a reagent disk cover.

FIG. 5 is a view showing another example of the lid closing guide portion provided on the reagent disk cover.

FIG. 6 is a plan view showing a state where the lid of the reagent container is closed.

FIG. 7 is a front view of the reagent container showing a state where the lid of the reagent container is closed.

FIG. 8 is a view explaining a contact angle between the lid of the reagent container and the lid closing guide portion.

FIG. 9 is a view explaining some examples of the contact angle between the lid closing guide portion and the lid.

FIG. 10 is a schematic sectional view of the reagent storage accommodating the reagent container.

DESCRIPTION OF EMBODIMENTS

In the following, a preferred embodiment of an automatic analyzer according to the present invention will be described with reference to the drawings. Note that in the following description and the accompanying drawings, components having the same functional configuration are designated with the same reference signs, and redundant description is omitted. The drawings schematically depict an embodiment, and actual objects may be illustrated in a simplified form.

First Embodiment

Referring to FIG. 1, an example of the overall structure of an automatic analyzer 1-1 that automatically performs quantitative or qualitative analysis of a specific component included in a specimen such as blood or urine will be described. The automatic analyzer 1-1 includes a worktable 1-3 on which tasks necessary for the analysis of a specimen and a control unit 1-25 that controls components provided on the worktable 1-3. The worktable 1-3 is provided with a reagent storage 1-2, a reagent dispensing portion 1-13, a heat block 1-4, a specimen rack transporting portion 1-5, a specimen dispensing portion 1-6, a dispensing tip and reaction container transporting portion 1-9, and an analysis unit 1-14. In the following, the components will be described.

The reagent storage 1-2 stores a reagent container 1-15 that contains a reagent used for analysis at a predetermined temperature, and has a reagent disk 1-24 and a reagent disk cover 1-16. The reagent disk 1-24 accommodates a plurality of reagent containers 1-15. The reagent disk cover 1-16 is a cover that is put on the reagent disk 1-24, including a charging port 1-17 through which the reagent container 1-15 is charged into the reagent disk 1-24 and a dispensing hole 1-18 through which a reagent is dispensed from the reagent container 1-15. The detail of the reagent storage 1-2 will be described later with reference to FIG. 3.

The reagent dispensing portion 1-13 aspirates a reagent from the reagent container 1-15 stored on the reagent storage 1-2 through the dispensing hole 1-18, and dispenses the reagent into an empty reaction container 1-19 mounted on the heat block 1-4.

The heat block 1-4 holds the reaction container 1-19 at a constant temperature, causes the reaction container 1-19 to move in a circumferential direction by rotational motion, and disposes the reaction container 1-19 at a position accessible by the specimen dispensing portion 1-6 or the reagent dispensing portion 1-13.

The specimen rack transporting portion 1-5 transports a specimen rack 1-20 mounted with a plurality of specimen containers 1-21 containing a specimen, and disposes the specimen container 1-21 at a position accessible by the specimen dispensing portion 1-6.

The specimen dispensing portion 1-6 aspirates the specimen contained in the specimen container 1-21, and dispenses the specimen into the reaction container 1-19 mounted on the heat block 1-4. In order to prevent the entry of foreign substances in dispensing the specimen, the specimen dispensing portion 1-6 is used with a specimen dispensing tip 1-23 replaced every time when the specimen is dispensed. The specimen dispensing tip 1-23 and the reaction container 1-19 after used are discarded to a waste hole 1-8.

The dispensing tip and reaction container transporting portion 1-9 transports the specimen dispensing tip 1-23 mounted on the dispensing tip and reaction container mounting portion 1-7 and the reaction container 1-19, and disposes the specimen dispensing tip 1-23 on a tip installing position 1-10, and the reaction container 1-19 on the heat block 1-4. Note that a holding member 1-22 is erected on the dispensing tip and reaction container mounting portion 1-7 and the specimen dispensing tip 1-23 and the reaction container 1-19, which are not used, are accommodated in the holding member 1-22.

The analysis unit 1-14 analyzes a reaction solution, which is stirred by a reaction container stirring portion 1-11 and then aspirated from the reaction container 1-19 by a reaction liquid aspiration portion 1-12, and outputs an analysis result.

The control unit 1-25 creates an analysis plan in response to an analysis request inputted by an operator through a keyboard, a touch panel, and any other device, transmits a control signal based on the analysis plan, and thus controls the operation of the components provided on the worktable 1-3. The control unit 1-25 may include a storage unit that stores information on analysis requests, analysis parameters, analysis results, and any other data.

Referring to FIG. 2, the reagent container 1-15, as an example of a container that contains a reagent or a specimen, will be described. FIG. 2(*a*) is a plan view and FIG. 2(*b*) is a front view showing a state in which a lid 2-1 of the reagent container 1-15 is opened. FIG. 2(*c*) is a plan view and FIG. 2(*d*) is a front view showing a state in which the lid 2-1 is closed. Note that in FIG. 2, the lid 2-1 is hatched to be easily seen.

The reagent container 1-15 has a hinge 2-2 and a reagent accommodation portion 2-3 together with the lid 2-1. The hinge 2-2 is a rotation fulcrum that supports the lid 2-1 that is openable and closable. The reagent accommodation portion 2-3 is a space in which the reagent is contained. The lid 2-1 is closed, and thus the evaporation and drying of the reagent contained in the reagent accommodation portion 2-3 or the entry of dirt and the like into a reagent can be prevented. Note that in the reagent accommodation portion 2-3, a specimen may be contained instead of a reagent.

Referring to FIG. 3, the reagent storage 1-2 will be described in detail. As described above, the reagent storage 1-2 has the reagent disk 1-24 that accommodates the reagent container 1-15 and the reagent disk cover 1-16 including the charging port 1-17 and the dispensing hole 1-18.

The reagent disk 1-24 includes a shaft 3-1 connected to a motor and the like, not shown, and is rotated on an x-y plan about the shaft 3-1, as a rotation axis, rotated by the driving force of a motor and the like. Note that the reagent disk cover 1-16 put on the reagent disk 1-24 is not rotated even though the shaft 3-1 is rotated. The rotation of the reagent disk 1-24 enables disposing the reagent container 1-15, which is charged from the charging port 1-17, directly below the dispensing hole 1-18, or returning the reagent container 1-15 to the initial position. The operator can also manually rotate the shaft 3-1 or the reagent disk 1-24 to a desired position. Note that the reagent container 1-15 to be accommodated in the reagent disk 1-24 is disposed at a certain tilt angle to the radial direction of the reagent disk 1-24. The tilt angle is at zero degrees, the reagent container 1-15 is disposed in parallel with the radial direction of the reagent disk 1-24.

The reagent disk cover 1-16 includes a lid opening and closing portion 3-2 and a charging port lid 3-3 together with the charging port 1-17 and the dispensing hole 1-18. The lid opening and closing portion 3-2 has a lug that opens and closes the lid 2-1 of the reagent container 1-15. The lid opening and closing portion 3-2 brings the lid 2-1 of the reagent container 1-15 disposed directly below the dispensing hole 1-18 into an opened state during the aspiration of the reagent by the reagent dispensing portion 1-13, whereas the lid opening and closing portion 3-2 brings the lid 2-1 into a closed state after the aspiration of the reagent. The charging port lid 3-3 is a lid to be put on the charging port 1-17, and FIG. 3 shows the state in which the charging port lid 3-3 is opened.

Referring to FIG. 4, an example of the reagent disk cover 1-16 will be described. FIG. 4(*a*) is a plan view of the reagent disk cover 1-16 viewed from the reagent disk 1-24 side, i.e., the back surface of the reagent disk cover 1-16 in FIG. 3. FIG. 4(*b*) is a cross sectional view cut along straight line 4-5 in FIG. 4(*a*).

On the surface of the reagent disk cover 1-16 facing the reagent disk 1-24, a lid closing guide portion 4-1 is provided on both sides of the charging port 1-17 along the circumferential direction of the reagent disk cover 1-16. The lid closing guide portion 4-1 is brought into contact with the edge of the lid 2-1 to close the lid 2-1. Note that a contact angle 4-4 of the lid closing guide portion 4-1 with the lid 2-1 is an angle sandwiched by a half-line 4-2 in the rotation axis direction of the hinge 2-2 and a half-line 4-3 in the tangent direction of the lid closing guide portion 4-1, started from the point at which the lid closing guide portion 4-1 is in contact with the lid 2-1. The size of the contact angle 4-4 is set corresponding to the tilt angle of the reagent container 1-15 to the radial direction of the reagent disk 1-24. As shown in FIG. 4(*b*), the lid closing guide portion 4-1 is buried in the reagent disk cover 1-16, and has a recessed shape. In the case in which the lid closing guide portion 4-1 has a recessed shape, the volumetric capacity in the reagent storage 1-2 becomes small, and thus the reagent container 1-15 to be accommodated is easily kept at a predetermined temperature.

The reagent disk 1-24 is rotated to move the reagent container 1-15 toward the lid closing guide portion 4-1, the lid closing guide portion 4-1 is brought into contact with the edge of the lid 2-1 in the opened state, and the lid 2-1 is closed. That is, the lid closing guide portion 4-1 enables closing the lid 2-1 with no contact with the upper surface of the lid 2-1 on which information on the reagent is written. FIG. 4(a) shows one of the lids 2-1 in the opened state, for illustrating the manner in which the lid closing guide portion 4-1 is in contact with the lid 2-1.

Note that the lid closing guide portion 4-1 is provided on both sides of the charging port 1-17, and thus closing the lid 2-1 is enabled even though the reagent disk 1-24 is rotated in any direction. The lid closing guide portion 4-1 may be provided near the dispensing hole 1-18. The lid closing guide portion 4-1 is provided near the dispensing hole 1-18, and thus the lid 2-1 is closed by the lid closing guide portion 4-1 even in the case in which the lid opening and closing portion 3-2 fails to close the lid 2-1 after the aspiration of the reagent.

Referring to FIG. 5, another example of the reagent disk cover 1-16 will be described. Similarly to FIG. 4(a), FIG. 5(a) is a plan view of the reagent disk cover 1-16 viewed from the reagent disk 1-24 side. FIG. 5(b) is a cross sectional view showing cut along straight line 4-5 in FIG. 5(a). Also on the reagent disk cover 1-16 shown in FIG. 5, the lid closing guide portion 4-1 is provided on the surface facing the reagent disk 1-24. Note that as swoon in FIG. 5(b), the lid closing guide portion 4-1 in the present example protrudes from the reagent disk cover 1-16, and has a protruding shape. Since the lid closing guide portion 4-1 having a protruding shape can be prepared separately from the reagent disk cover 1-16, the contact angle 4-4 of the lid closing guide portion 4-1 with the lid 2-1 is easily adjusted.

Referring to FIGS. 6 and 7, a manner in which the lid 2-1 of the reagent container 1-15 is closing will be described. FIG. 6 is a plan view of the reagent container 1-15 and FIG. 7 is a front view, showing one lid closing guide portion 4-1 alone. As the drawings go from FIG. 6(a) to FIG. 6(d) and from FIG. 7(a) to FIG. 7(d), the reagent container 1-15 is moved in the direction of an arrow 6-1 along a migration path 6-2 with the rotation of the reagent disk 1-24. Note that the rotation of the reagent disk 1-24 may be performed by the driving force of a motor and the like or performed manually. Instead of the rotation of the reagent disk 1-24, the reagent disk cover 1-16 may be rotated, and the lid 2-1 of the reagent container 1-15 and the lid closing guide portion 4-1 only have to be in relative displacement. In the following, the procedures will be described in order.

In FIG. 6(a) and FIG. 7(a), the lid 2-1 is in the opened state, and the lid closing guide portion 4-1 is apart from the lid 2-1. Note that the opening angle of the lid 2-1, in the state in which the lid 2-1 is opened, i.e., an angle formed by the x-y plan, which is the upper surface of the reagent container 1-15, and the lid 2-1 is not limited to an angle of 90 degrees as shown in FIG. 7(a), and the angle only has to be less than an angle of 180 degrees. Upon the rotation of the reagent disk 1-24 causing the reagent container 1-15 to move toward the lid closing guide portion 4-1, in FIG. 6(b) and FIG. 7(b), the lid closing guide portion 4-1 is brought into contact with the edge of the lid 2-1, and force in the direction of the arrow 6-3 begins to act on the lid 2-1. Upon the further rotation of the reagent disk 1-24, in FIG. 6(c) and FIG. 7(c), the force in the direction of the arrow 6-3 by the lid closing guide portion 4-1 continuously acts on the lid 2-1, and then the lid 2-1 is about to be closed. FIG. 6(d) and FIG. 7(d) show the state in which the reagent container 1-15 passes through the position of the lid closing guide portion 4-1, and the lid 2-1 is fully closed.

Note that during the lid closing guide portion 4-1 and the lid 2-1 in contact with each other, preferably, the lid closing guide portion 4-1 is provided such that the contact angle 4-4 of the lid closing guide portion 4-1 with the lid 2-1 is an acute angle. Since the contact angle 4-4 has an acute angle, the lid closing guide portion 4-1 is brought into contact with the edge of the lid 2-1 with no contact with the upper surface of the lid 2-1, and acts on the force in the direction of the arrow 6-3 to the lid 2-1. That is, closing the lid 2-1 is enabled without wearing the upper surface of the lid 2-1 on which information on the reagent or the specimen is written.

Referring to FIG. 8, the contact angle 4-4 of the lid closing guide portion 4-1 with the lid 2-1 will be described. Note that FIG. 8 is a view extracting the contact angle 4-4 and the arrow 6-3 from FIG. 6(b) together with the lid closing guide portion 4-1 and the lid 2-1. When the contact angle 4-4 is $\theta_0$ and the normal reaction that the lid closing guide portion 4-1 affects the lid 2-1 is $F_v$, $F_v$ is separated into a component $F_v \cos \theta_0$ and a component $F_v \sin \theta_0$. $F_v \cos \theta_0$ is the component in the direction of the arrow 6-3, the direction in which the lid 2-1 is closed, and $F_v \sin \theta_0$ is a component in the direction vertical to the arrow 6-3. Since $F_v \sin \theta_0$ is also a component in parallel with the rotation axis of the hinge 2-2, preferably, $F_v \sin \theta_0$ is made much smaller in order to reduce a load on the hinge 2-2. In order to increase the component in the direction in which the lid 2-1 is closed, preferably, $F_v \cos \theta_0$ is made much larger. Therefore, preferably, $\theta_0$, i.e., the contact angle 4-4 is made small. Note that torque involved in the relative displacement between the lid closing guide portion 4-1 and the lid 2-1 may be adjusted to control the normal reaction $F_v$.

Referring to FIG. 9, some examples of the contact angle 4-4 of the lid closing guide portion 4-1 with the lid 2-1 will be described. Note that since the lid closing guide portion 4-1 and the lid 2-1 are in relative displacement, in FIG. 9, the case will be described in which the lid closing guide portion 4-1 is rotated about a point 7-2 in the direction of an arrow 7-1 to the reagent container 1-15 to be fixed. The slope of the lid closing guide portion 4-1 is $\theta_1$, and the slope of the reagent container 1-15 is $\theta_2$. FIG. 9(a) and FIG. 9(b) show the case in which the lid 2-1 is closed on the point 7-2 side, and the counterclockwise direction from a straight line 7-4 connecting a center 7-3 to the point 7-2 of the reagent container 1-15 is a positive direction $\theta_1$, and the clockwise direction from a straight line 7-5 vertical to the straight line 7-4 is a positive direction $\theta_2$. FIG. 9(c) and FIG. 9(d) show the case in which the lid 2-1 is closed on the opposite side of the point 7-2, and the clockwise direction from the straight line 7-4 is the positive direction $\theta_1$, and the counterclockwise direction from the straight line 7-5 is the positive direction $\theta_2$. In any case, $0 \leq \theta_1 \leq \pi$ and $0 \leq \theta_2 \leq 2\pi$, $\theta_0$ that is the contact angle 4-4 is a reminder when the quotient of $(\theta_1 + \theta_2)/\pi$ is an integer, which is $\theta_0 = \theta_1 + \theta_2$ [mod $\pi$ rad].

Referring to FIG. 10, preferable heights in the inside of the reagent storage 1-2 will be described. FIG. 10 is a cross sectional view of the reagent storage 1-2. The reagent disk 1-24 that accommodates the reagent container 1-15 is housed in a base portion 9-4, and the base portion 9-4 and the reagent disk 1-24 are covered with the reagent disk cover 1-16. The charging port 1-17 of the reagent disk cover 1-16 is in the closed state by the charging port lid 3-3. Note that the state in which the charging port lid 3-3 is opened is depicted by an alternate long and two short dashes line.

Preferably, a distance 9-2 from a bottom surface 9-1 on the inner side of the reagent disk 1-24 to the charging port lid 3-3 is longer than a distance 9-3 from the top end of the lid 2-1 to the bottom surface 9-1 in the opened state. The distance 9-2 is made longer than the distance 9-3, and this eliminates the contact of the lid 2-1 to the charging port lid 3-3 in the opened state. That is, even though the charging port lid 3-3 is closed in the state in which the lid 2-1 of the reagent container 1-15 fails to close, the reagent container 1-15 and the reagent storage 1-2 do not interfere with each other, and thus an unintentional application of a load to the lid 2-1 can be prevented.

As described above, the embodiment of the present invention is described. The present invention is not limited to the foregoing embodiment, and the component may be modified in the scope not deviating from the gist of the invention. For example, the relative displacement between the container and the lid closing guide portion is not limited to rotation. The relative displacement may be relative displacement due to given linear movement. The present invention is applicable to any container having an openable and closable lid by a rotation fulcrum, not limited to the container that contains a reagent or a specimen. A plurality of components disclosed in the foregoing embodiment may be appropriately combined. Furthermore, some components may be removed from the entire components shown in the foregoing embodiment.

REFERENCE SIGN LIST 1-1: automatic analyzer, 1-2: reagent storage, 1-3: worktable, 1-4: heat block, 1-5: specimen rack transporting portion, 1-6: specimen dispensing portion, 1-7: dispensing tip and reaction container mounting portion, 1-8: waste hole, 1-9: dispensing tip and reaction container transporting portion, 1-10: tip installing position, 1-11: reaction container stirring portion, 1-12: reaction liquid aspiration portion, 1-13: reagent dispensing portion, 1-14: analysis unit, 1-15: reagent container, 1-16: reagent disk cover, 1-17: charging port, 1-18: dispensing hole, 1-19: reaction container, 1-20: specimen rack, 1-21: specimen container, 1-22: holding member, 1-23: specimen dispensing tip, 1-24: reagent disk, 1-25: control unit, 2-1: lid, 2-2: hinge, 2-3: reagent accommodation portion, 3-1: shaft, 3-2: lid opening and closing portion, 3-3: charging port lid, 4-1: lid closing guide portion, 4-2: half-line, 4-3: half-line, 4-4: contact angle, 4-5: line, 6-1: arrow, 6-2: moving path, 6-3: arrow, 7-1: arrow, 7-2: point, 7-3: center, 7-4: line, 7-5: line, 9-1: bottom surface, 9-2: distance, 9-3: distance, 9-4: base portion

The invention claimed is:

1. An automatic analyzer, comprising:
a disk accommodating a container that has a lid openable and closable by a rotation fulcrum, the container accommodating a reagent or a specimen;
an analysis unit that analyzes a reaction solution aspirated from a reaction container, the reaction solution including the specimen or the reagent dispensed from the container;
a cover covering the disk;
a lid closing guide included in the cover and which, upon movement of the container by rotation of the disk accommodating the container, a side edge of the lid contacts the lid closing guide thereby closing the lid,
wherein the lid closing guide is not in contact with an upper surface of the lid, and is in contact with the side edge of the lid upon closing the lid.

2. The automatic analyzer according to claim 1,
wherein, in a bottom view, a contact angle between the lid closing guide and the lid is an acute angle with respect to a rotation axis of the rotation fulcrum and a line tangential to the lid closing guide when the lid closing guide is in contact with the edge.

3. The automatic analyzer according to claim 1,
wherein the lid closing guide is embedded in the cover.

4. The automatic analyzer according to claim 1,
wherein the lid closing guide protrudes from the cover.

5. An automatic analyzer comprising:
a container that has a lid openable and closable by a rotation fulcrum, the container accommodating a reagent or a specimen;
an analysis unit that analyzes a reaction solution aspirated from a reaction container, the reaction solution including the specimen or the reagent dispensed from the container; and
a lid closing guide, which upon relative movement of the lid closing guide with respect to the container, a side edge of the lid contacts the lid closing guide thereby closing the lid,
wherein upon closing the lid, the lid closing guide is in contact with the side edge of the lid to close the lid,
wherein, in a bottom view, a contact angle between the lid closing guide and the lid is an acute angle with respect to a rotation axis of the rotation fulcrum and a line tangential to the lid closing guide when the lid closing guide is in contact with the edge,
wherein the automatic analyzer further comprises a cover that covers the container and moves relative to the container, and
wherein the lid closing guide is provided on the cover.

6. The automatic analyzer according to claim 5,
wherein the lid closing guide is embedded in the cover.

7. The automatic analyzer according to claim 5,
wherein the lid closing guide protrudes from the cover.

8. The automatic analyzer according to claim 5,
wherein the cover includes a charging port through which the container is charged and a charging port lid that covers the charging port, and
wherein a distance from a bottom surface of the container to the charging port lid is longer than a distance from an upper end of the lid in an open state to the bottom surface of the container.

9. The automatic analyzer according to claim 8,
wherein the cover includes a charging port through which the container is charged and a charging port lid that covers the charging port, and
wherein a distance from a bottom surface of the container accommodation portion to the charging port lid is longer than a distance from an upper end of the lid in an open state to the bottom surface of the container accommodation portion.

10. An automatic analyzer comprising:
a container that has a lid openable and closable by a rotation fulcrum, the container accommodating a reagent or a specimen;
an analysis unit that analyzes a reaction solution aspirated from a reaction container, the reaction solution including the specimen or the reagent dispensed from the container; and
a plurality of lid closing guides that, upon respective contact with the lid, close the lid by the container moving relative to the lid closing guides, wherein upon closing the lid, respective lid closing guides contact an edge of the lid to close the lid, wherein, in a bottom view, respective contact angles between each lid closing guide and the lid is an acute angle with respect to a rotation axis of the rotation fulcrum and a line tangential to the lid closing guide when respective lid closing guides contact the edge, wherein the automatic analyzer further comprises a cover that covers the container and moves relative to the container, and wherein the lid closing guide protrudes from the cover.

* * * * *